US010657062B2

(12) United States Patent
Tashiro et al.

(10) Patent No.: US 10,657,062 B2
(45) Date of Patent: May 19, 2020

(54) DISTRIBUTED STORAGE SYSTEM AND DISTRIBUTED STORAGE CONTROL METHOD WHEREIN DATA STORED IN CACHE MATRIX, THAT IS TO BE STORED IN SAID DISTRIBUTED STORAGE, IS TRACKED BY COLUMNS AND ROWS

(71) Applicant: HITACHI, LTD., Tokyo (JP)

(72) Inventors: Atsushi Tashiro, Tokyo (JP); Shintaro Ito, Tokyo (JP); Takeru Chiba, Tokyo (JP); Shinya Hayashi, Tokyo (JP); Satoshi Kamijo, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 15/821,997

(22) Filed: Nov. 24, 2017

(65) Prior Publication Data
US 2019/0026034 A1 Jan. 24, 2019

Related U.S. Application Data

(63) Continuation of application No. PCT/JP2017/026205, filed on Jul. 20, 2017.

(51) Int. Cl.
*G06F 12/0873* (2016.01)
*G06F 11/10* (2006.01)

(52) U.S. Cl.
CPC ...... *G06F 12/0873* (2013.01); *G06F 11/1076* (2013.01); *G06F 2212/1024* (2013.01); *G06F 2212/154* (2013.01); *G06F 2212/262* (2013.01); *G06F 2212/263* (2013.01); *G06F 2212/313* (2013.01)

(58) Field of Classification Search
None
See application file for complete search history.

(56) References Cited

U.S. PATENT DOCUMENTS

| 6,772,245 B1* | 8/2004 | Pomerantz | G06F 13/385 |
| | | | 709/233 |
| 9,344,492 B1* | 5/2016 | Dantkale | G06F 12/0223 |
| 2002/0194427 A1* | 12/2002 | Hashemi | G06F 11/1096 |
| | | | 711/114 |

(Continued)

FOREIGN PATENT DOCUMENTS

JP 2010-079928 A 4/2010

*Primary Examiner* — William B Partridge
*Assistant Examiner* — Chie Yew
(74) *Attorney, Agent, or Firm* — Volpe and Koenig, P.C.

(57) ABSTRACT

A first node retains node management information for managing each of the nodes, presence or absence in the first node of a transfer target data set, a write destination, which is a strip in a node area of the node. Concerning the second nodes, this is each of the nodes other than the first node, the first node: (A) when specifying from the node management information that there are two or more transfer target data sets, write destinations that are respectively two or more strips in a node area of the second node, specifies two or more intra-node positions respectively corresponding to the two or more transfer target data sets; and (B) transmits, to the second node, one command for transfer, transfer targets of which are two or more transfer target data sets respectively present in the specified two or more intra-node positions.

11 Claims, 8 Drawing Sheets

(56) References Cited

U.S. PATENT DOCUMENTS

| | | | |
|---|---|---|---|
| 2003/0145167 A1* | 7/2003 | Tomita | G06F 3/0608 |
| | | | 711/114 |
| 2006/0200697 A1* | 9/2006 | Ito | G06F 11/1076 |
| | | | 714/6.12 |
| 2012/0054429 A1* | 3/2012 | Gupta | G06F 3/0604 |
| | | | 711/114 |
| 2012/0254507 A1* | 10/2012 | Chang | G06F 12/0868 |
| | | | 711/103 |
| 2013/0182502 A1 | 7/2013 | Cheo et al. | |
| 2013/0290630 A1* | 10/2013 | Ito | G06F 11/1076 |
| | | | 711/114 |
| 2015/0058291 A1* | 2/2015 | Earl | G06F 17/30144 |
| | | | 707/625 |
| 2016/0034186 A1* | 2/2016 | Weiner | G06F 3/061 |
| | | | 710/74 |
| 2016/0173598 A1 | 6/2016 | Amit et al. | |
| 2016/0188462 A1* | 6/2016 | Shin | G06F 16/1727 |
| | | | 707/820 |
| 2016/0335189 A1* | 11/2016 | Blinick | G06F 12/0802 |
| 2017/0068623 A1* | 3/2017 | Misra | G06F 12/0815 |
| 2017/0097886 A1* | 4/2017 | Banerjee | G06F 12/0868 |

* cited by examiner

FIG. 8

# DISTRIBUTED STORAGE SYSTEM AND DISTRIBUTED STORAGE CONTROL METHOD WHEREIN DATA STORED IN CACHE MATRIX, THAT IS TO BE STORED IN SAID DISTRIBUTED STORAGE, IS TRACKED BY COLUMNS AND ROWS

CROSS-REFERENCE TO RELATED APPLICATION

This application is a continuation application of PCT/JP2017/026205 of an international application designating the United States of America filed on Jul. 20, 2017. The entire content of the PCT application is incorporated herein by reference.

TECHNICAL FIELD

The present invention generally relates to storage control in a distributed storage system.

BACKGROUND

As a technique concerning a distributed storage, for example, techniques disclosed in US2016/0173598 and Japanese Patent Laid-Open No. 2010-079928 are known.

US2016/0173598 discloses, for example, the following. That is, among a plurality of servers configuring an SDS (Software Defined Storage) grid, a first server receives an I/O (Input/Output) request from a host computer. When identifying on the basis of a local grid data map indicating places of all data managed by the SDS grid that a second server processes the I/O request, the first server transfers the I/O request to the second server.

Japanese Patent Laid-Open No. 2010-079928 discloses, for example, the following. A plurality of storage devices are coupled to a storage system. Each of the plurality of storage devices includes a plurality of storage blocks. The storage system buffers a plurality of write requests and writes data in a defined group of storage blocks.

SUMMARY

In the following explanation, a computer as an element of a distributed storage system is sometimes referred to as "node". Any computer including calculation resources such as a processor, a memory, and a communication interface device can be the node. The node may be a physical computer (e.g., a general-purpose computer or a physical storage apparatus) or a virtual computer that operates on the basis at least a part of the calculation resources of the physical computer. One physical computer may execute a virtual computer such as a host that issues an I/O request and a virtual computer (e.g., an SDS) such as a storage apparatus that receives and processes the I/O request.

In the following explanation, a redundant configuration group is formed by a plurality of nodes. Examples of a redundant configuration include Erasure Coding, a RAIN (Redundant Array of Independent Nodes), inter-node mirroring, and a RAID (Redundant Array of Independent (or Inexpensive) Disks) in which a node is regarded as one drive. The redundant configuration may be any of the foregoing. Other schemes (schemes for configuring a redundant configuration group among nodes) may be adopted.

Therefore, in the following explanation, the "redundant configuration group" may be a group that is configured by two or more storage areas respectively provided by two or more nodes and stores data.

Definitions of a respective plurality of kinds of storage areas in the following explanation are as described below.

A "redundant configuration area" is a logical storage area provided by the redundant configuration group.

A "node area" is a logical storage area provided by each of a plurality of nodes. A plurality of node areas respectively provided by the plurality of nodes configure the redundant configuration area.

A "strip" is a part of the node area. The strip stores a user data set or a parity. The strip in which the user data set is stored can be referred to as "user strip". The strip in which the parity is stored can be referred to as "parity strip". Note that the "user data set" is a part of a user data unit serving as at least a part of user data (write target data) conforming to a write request. The "user data unit" is a set of all user data sets corresponding to a stripe. The "parity" is a data set generated on the basis of the user data unit. The "data set" is data stored in one strip. In the following explanation, the "data set" is the user data set or the parity. That is, the data set is data in strip units.

A "stripe" is a storage area configured by two or more strips (e.g., two or more strips in the same logical address) respectively present in two or more node areas in the redundant configuration area.

In the distributed storage system (e.g., a storage system of a scale-out type), unless a write destination strip of a data set after update is a strip in the node, each of the nodes performs inter-node transfer, that is, transfer the data set after update to a node including the write destination strip.

The inter-node transfer is performed in strip units. Therefore, when all of N (N is a natural number) write destination strips respectively corresponding to N data sets after update are absent in each of the nodes, each of the nodes performs the inter-node transfer concerning each of the N write destination strips. That is, N times of the inter-node transfer are performed. Since the inter-node transfer is an overhead of communication, the inter-node transfer is one of causes that deteriorate the performance (e.g., I/O performance) of the distributed storage system.

A first node, which is any one node among the plurality of nodes, retains node management information for managing, for each of the nodes, presence or absence in the first node of a transfer target data set, which is a data set, a write destination of which is a strip in a node area of the node. Concerning each of second nodes, which is each of nodes other than the first node among the plurality of nodes, the first node, (A) when specifying on the basis of the node management information that there are two or more transfer target data sets, write destinations of which are respectively two or more strips (i.e., two or more strips corresponding to the second node among two or more stripes) in a node area of the second node, specifies, on the basis of the node management information, two or more intra-node positions respectively corresponding to the two or more transfer target data sets, and (B) transmits, to the second node, one command for transfer, transfer targets of which are two or more transfer target data sets respectively present in the specified two or more intra-node positions.

It is possible to reduce performance deterioration of the distributed storage system.

DETAILED DESCRIPTION OF THE EMBODIMENT

An embodiment is explained below.

Note that, in the following explanation, an "interface unit" includes one or more interfaces. The one or more interfaces may be one or more interface devices of the same type (e.g., one or more NICs (Network Interface Cards)) or may be two or more interface devices of different types (e.g., an NIC and an HBA (Host Bus Adapter)).

In the following explanation, of a memory unit and a PDEV unit, a "storage unit" includes at least the memory unit. The PDEV unit includes one or more PDEVs. The memory unit includes one or more memories. At least one memory may be a volatile memory or may be a nonvolatile memory. The storage unit is mainly used in processing by a processor unit.

In the following explanation, a "processor unit" includes one or more processors. At least one processor is typically a CPU (Central Processing Unit). The processor may include a hardware circuit that performs a part or all of processing.

In the following explanation, information is sometimes explained with an expression "xxx table". However, the information may be represented by any data structure. That is, in order to indicate that the information does not depend on a data structure, the "xxx table" can be referred to as "xxx information". In the following explanation, the configuration of each of tables is an example. One table may be divided into two or more tables or all or a part of two or more tables may be one table.

In the following explanation, processing is sometimes explained with a "program" set as a subject. However, the program is executed by a processor (e.g., a CPU (Central Processing Unit)) to perform determined processing while using a storage unit (e.g., a memory) and/or an interface device (e.g., a communication port) and the like as appropriate. Therefore, the subject of the processing may be the processor (or an apparatus or a system including the processor). The processor may include a hardware circuit that performs a part or all of processing. The program may be installed in an apparatus such as a computer from a program source. The program source may be, for example, a program distribution server or a computer-readable (e.g., nontransitory) recording medium. In the following explanation, two or more programs may be realized as one program or one program may be realized as two or more programs.

In the following explanation, "PDEV" means a physical storage device and typically is a nonvolatile storage device (e.g., an auxiliary storage device), for example, an HDD (Hard Disk Drive) or an SSD (Solid State Drive).

Further, definitions of a respective plurality of kinds of storage areas are as described below.

A "cache strip" is a storage area corresponding to a strip and is a storage area on a CM (cache memory). Note that the cache strip and the strip may have a fixed size.

A "cache stripe" is a storage area corresponding to a stripe and is a storage area on the CM. The cache stripe is configured by two or more cache strips respectively corresponding to two or more strips configuring a stripe corresponding to the cache stripe. A data set (a user data set or a parity) in a cache strip is written in a node area including a strip corresponding to the cache strip.

A "cache node area" is a storage area corresponding to the node area and is a storage area on the CM. The cache node area is configured by two or more cache strips respectively corresponding to two or more strips configuring the node area corresponding to the cache node area.

A "VOL" is an abbreviation of a logical volume and is a logical storage area provided to a host. The VOL may be a real VOL (RVOL) or may be a virtual VOL (VVOL). The "RVOL" may be a VOL based on physical storage resources (e.g., one or more PDEVs) included in a storage system that provides the RVOL. The "VVOL" is configured by a plurality of virtual areas (virtual storage areas) and may be a VOL conforming to a capacity virtualization technique (typically, Thin Provisioning).

In the following explanation, when elements of the same type are explained without being distinguished, reference symbols are sometimes used. When the elements of the same type are distinguished and explained, IDs (e.g., identification numbers) of the elements are sometimes used. For example, when nodes are explained without being particularly distinguished, the nodes are sometimes described as "node 101". When the respective nodes are distinguished and explained, the nodes are sometimes described as "node 0" and "node 1". In the following explanation, by adding n to names of elements in a node n (n is an integer equal to or larger than 0), it is possible to distinguish in which node an element is included (or to which node the element corresponds).

Figure 1:
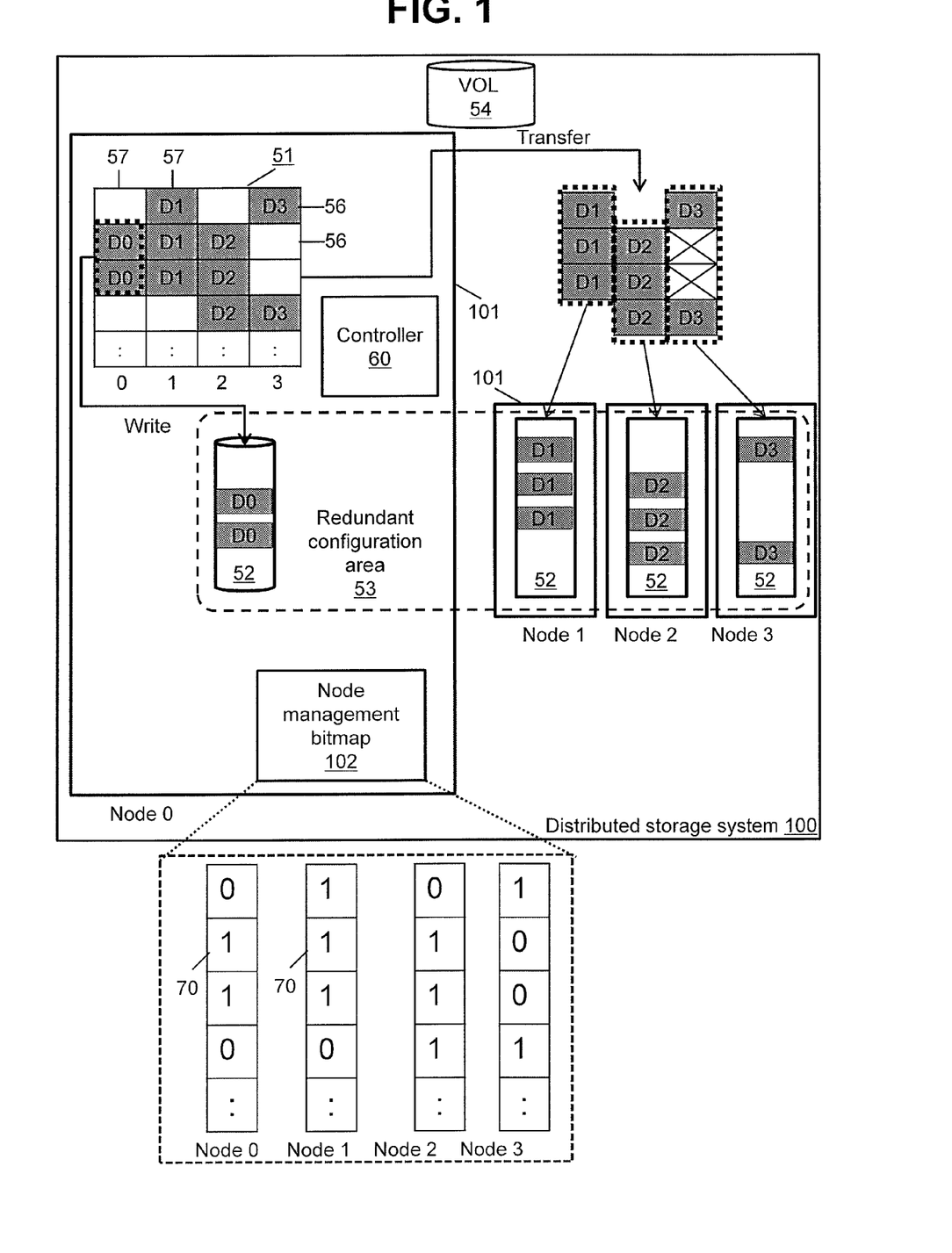
FIG. 1 shows an overview of an embodiment.

FIG. 1 shows an overview of the embodiment.

A distributed storage system 100 includes a plurality of nodes 101, for example, nodes 0 to 3. Each of the nodes 101 provides a node area 52. Node areas 0 to 3 configure a redundant configuration area 53. The node areas 0 to 3 are associated with a VOL 54 provided by the nodes 0 to 3.

Each of the nodes 101 includes a CM (cache memory) 51. The CM 51 may be one or more memories or may be partial areas of one or more memories. In the CM 51, for example, a user data set of a write target conforming to a write request, a user data set of a read target conforming to a read request, a parity, and data sets conforming to commands for transfer from other nodes are temporarily stored. A storage capacity of the CM 51 is typically smaller than a storage capacity of the node area 52. At least a part of the CM 51 is logically a matrix-like plurality of cache strips (hereinafter, cache strip matrixes). A plurality of cache strip rows are a plurality of cache stripes 56 (i.e., the plurality of cache strip rows respectively correspond to a plurality of stripes). A plurality of cache strip columns are a plurality of cache node areas 57 (i.e., the plurality of cache strip columns respectively correspond to the plurality of nodes 101). Note that a correspondence relation between addresses of areas in the CM 51 and addresses of strips dynamically changes. For example, a second cache strip and a third cache strip are continuous in a cache node area 0. However, in the node area 0, a strip corresponding to the second cache strip and a strip corresponding to the third cache strip are not always continuous.

Each of the nodes 101 includes a controller 60. The controller 60 is an example of a function exhibited by executing one or more computer programs. The controller 60 controls input/output and the like of a data set.

In each of the nodes 101, the controller 60 manages a node management bitmap 102. The controller 60 updates the node management bitmap 102 according to update of the CM 51. The node management bitmap 102 is an example of node management information for managing, for each of nodes, an intra-node position where a transfer target data set is present. The node management bitmap 102 is configured by a plurality of sub-bitmaps 70 respectively corresponding to the plurality of nodes. The sub-bitmap 70 is an example of sub-node management information. The plurality of sub-bitmaps 70 respectively correspond to the plurality of cache node areas 57. Concerning each of the sub-bitmaps 70, two or more bits respectively correspond to two or more cache strips configuring the cache node area 57 corresponding to the sub-bitmap 70. A bit "0" means that a data set in a cache strip corresponding to the bit is a non-transfer target. A bit "1" means that a data set in a cache strip corresponding to the bit is a transfer target. The cache strip in which the transfer target data set is stored can be referred to as "transfer target cache strip". The sub-bitmap 70 corresponding to the node n can be referred to as "sub-bitmap n". The cache node area 57 corresponding to the node n can be referred to as "cache node area n". Note that, as explained in detail below, the length of the sub-bitmap 70 (in other words, the number of bits configuring the sub-bitmap) can be changed. The length of the sub-bitmap 70 is equivalent to a maximum transfer length. The "maximum transfer length" may be a total amount of transferable data sets. In this embodiment, a data set is written in the CM 51 in a log-structured scheme explained below. Therefore, concerning each of the nodes, it can be expected that two or more transfer target cache strips tend to be continuous.

In the following explanation, in order to facilitate the explanation, as explanation of each of the nodes 101, the node 0 is mainly referred to as an example. That is, in the following explanation, the node 0 is an example of a first node (or an own node) and each of the nodes 1 to 3 is an example of a second node (or the other node).

According to this embodiment, the node 0 includes the node management bitmap 102 that manages, for each of the nodes, the position of the transfer target cache strip. A controller 0 can specify all transfer target cache strips concerning each of cache node areas 0 to 3 by referring to a node management bitmap 0.

The controller 0 can transfer, in one inter-node transfer (in other words, with one command for transfer (command for inter-node transfer)), all transfer target data sets in the specified all transfer target cache strips to each of the nodes 1 to 3 irrespective of whether the specified all transfer target cache strips are continuous cache strips. That is, it is possible to delete the number of times of the inter-node transfer (in other words, the number of commands for transfer to be issued). In other words, it is possible to collect a plurality of times of inter-node transfer in one inter-node transfer. Therefore, it is possible to reduce performance deterioration of the distributed storage system 100.

Specifically, for example, the controller 0 specifies, as three transfer target cache strips, three continuous cache strips in a cache node area 1 respectively corresponding to three continuous bits "1" (a first bit to a third bit) in a sub-bitmap 1. The controller 0 transfers, to the node 1, one command for transfer, transfer targets (write targets) of which are three data sets D1 in the three continuous transfer target cache strips, (e.g., a command designating designated an address and a transfer length of a top write destination strip in the node area 1). Note that the "transfer length" is length equal to or smaller than the maximum transfer length. As explained above, it can be expected that the transfer target cache strips tend to be continuous. Therefore, it is easy to transfer two or more transfer target data sets with one transfer command. Specifically, a top address and a transfer length only have to be designated in one command for transfer.

Similarly, for example, the controller 0 specifies, as three transfer target cache strips, three continuous cache strips in the cache node area 2 respectively corresponding to three continuous bits "1" (a second bit to a fourth bit) in a sub-bitmap 2. The controller 0 transfers, to the node 2, one command for transfer, transfer targets of which are three data sets D2 in the three continuous transfer target cache strips.

As explained above, two or more data sets set as transfer targets in one command for transfer to one node (two or more data sets, write destinations of which are respectively two or more strips) are not limited to two or more data sets in two or more continuous cache strips and may be two or more data sets in two or more discontinuous cache strips. In that case, it is possible to apply a method of a scatter gather list (SGL) (designate, with a command for transfer, an address concerning a non-transfer target data set). Specifically, for example, the controller 0 specifies, as two transfer target cache strips, two discontinuous cache strips in the cache node area 3 respectively corresponding to two discontinuous bits "1" (a first bit and a fourth bit) in a sub-bitmap 3. The controller 0 transfers, to the node 3, one command for transfer, transfer targets of which are two data sets D3 in the two discontinuous transfer target cache strips (e.g., a command designating designated an address and a transfer length of a top write destination strip in the node area 3 and a top address and a data length (an offset) of a non-write destination strip). That is, in a case in which transfer target cache strips are discontinuous, compared with a case in which transfer target cache strips are continuous, the number of parameters designated in order to transfer two or more transfer target data sets with one command for transfer increases. However, even if transfer target cache strips are discontinuous, it is possible to transfer two or more transfer target data sets with one command for transfer.

The controller 0 can write, in the node area 0 as well, two or more data sets in two or more strips in one write (i.e., with one write command). Specifically, for example, the controller 0 specifies, as two write target cache strips, two continuous cache strips in the cache node area 0 respectively corresponding to two continuous bits "1" (a second bit and a third bit) in the sub-bitmap 0. The controller 0 issues one write command, write targets of which are two data sets D0 in the two continuous write target cache strips. Consequently, the two data sets D0 are written in two strips in the node area 0.

This embodiment is explained in detail below.

Figure 2:
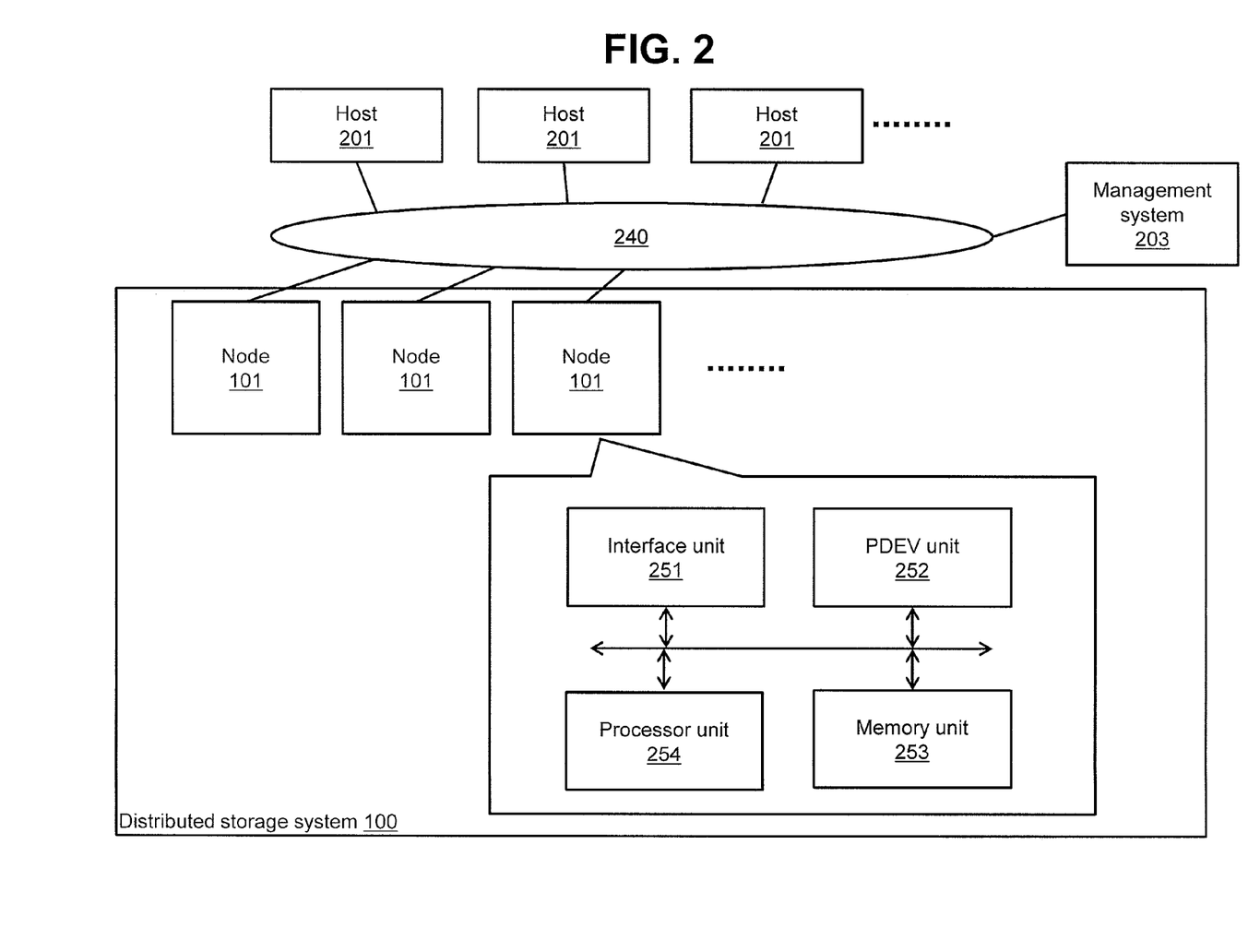
FIG. 2 shows a physical configuration of an entire system including a distributed storage system.

FIG. 2 shows a physical configuration of an entire system including the distributed storage system 100.

One or more hosts 201, a management system 203, and the distributed storage system 100 are coupled to a network 240. The network 240 may include, for example, at least one of an FC (Fibre Channel) network and an IP (Internet Protocol) network.

The host 201 issues an I/O request for user data. The host 201 may be a physical computer or may be a virtual computer executed in the physical computer. The host 201 functioning as the virtual computer may be executed in the node 101. Specifically, for example, in the same node 101, the virtual computer functioning as the host 201 and a virtual computer (e.g., an SDS (Software Defined Storage)) functioning as a storage (the controller 60), which receives the I/O request from the host 201 and processes the I/O request, may be executed.

The management system 203 manages the distributed storage system 100. The management system 203 may be configured by one or more computers (one or more physical computers or virtual computers). Specifically, for example, when a management computer includes a display device and displays information on the display device of the management computer, the management computer may be the management system 203. For example, when a management computer (e.g., a server) transmits information for display to a remote computer for display (e.g., a client) and the computer for display displays the information (when the management computer displays the information on the computer for display), a system including at least the management computer of the management computer and the computer for display may be the management system 203.

The distributed storage system 100 includes a plurality of nodes 101 coupled to the network 240. Each of the nodes 101 includes an interface unit 251, a PDEV unit 252, a memory unit 253, and a processor unit 254 coupled to the units. For example, the interface unit 251 is coupled to the network 240. Inter-node transfer is performed through the interface unit 251. A logical storage area based on the PDEV unit 252 is a node area. The memory unit 253 stores one or more programs and the node management bitmap 102 explained above. The processor unit 254 executes the one or more programs.

Figure 3:
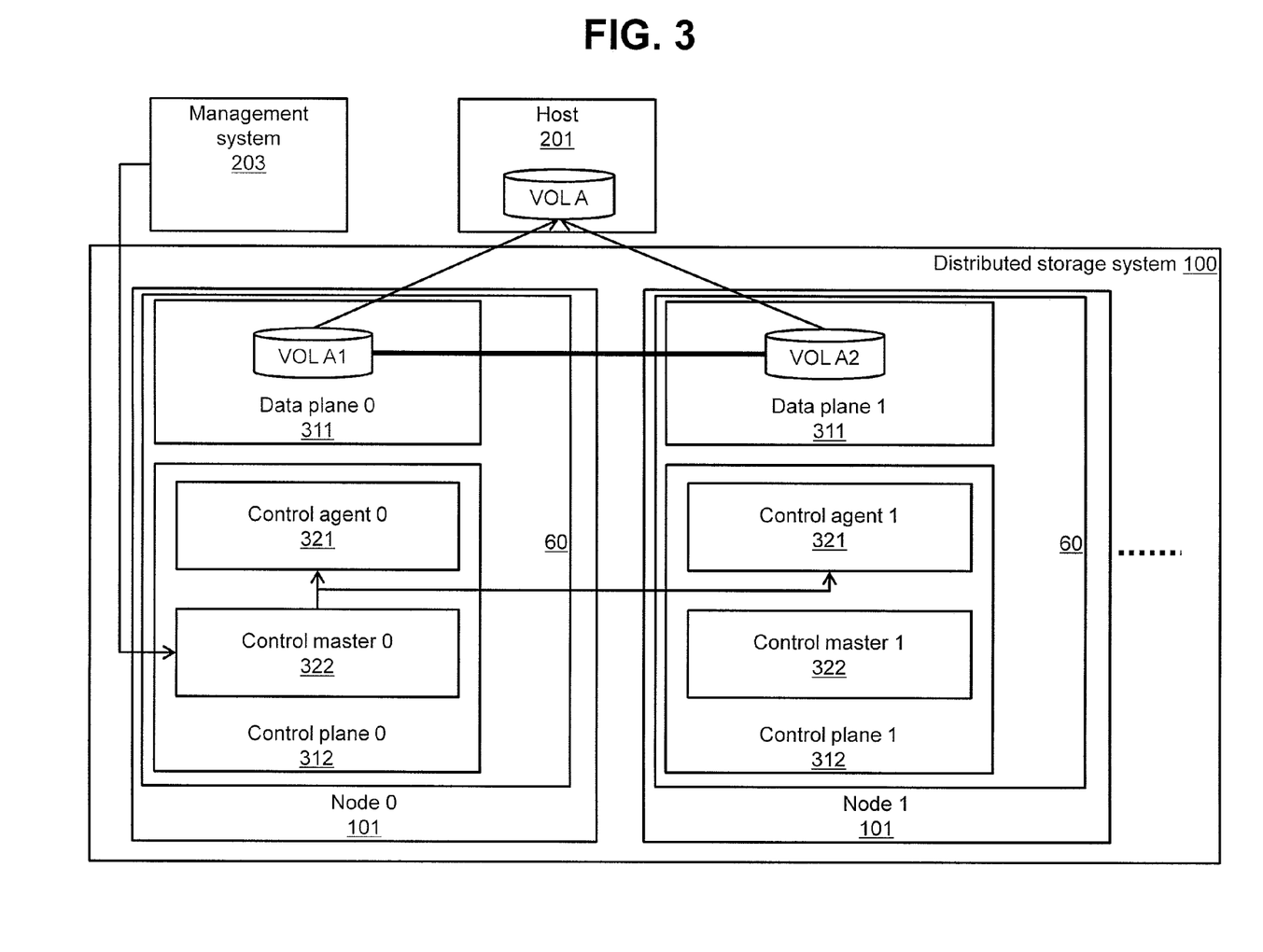
FIG. 3 shows a logical configuration of the entire system including the distributed storage system.

FIG. 3 shows a logical configuration of the entire system including the distributed storage system 100.

Two or more VOLs (e.g., a VOL A1 and a VOL A2) respectively included in the two or more nodes 101 are provided to the host 201 as one VOL (e.g., a VOL A). The host 201 transmits an I/O request designated the VOL A to the node 0 that provides the VOL A1 or the node 1 that provides the VOL A2.

Each of the nodes 101 includes the controller 60 as explained above. The controller 60 includes a data plane 311 and a control plane 312. The data plane 311 provides a VOL and performs processing conforming to the I/O request from the host 201. The control plane 312 performs various kinds of control. The control plane 312 includes a control master 322 and a control agent 321. The control master 322 receives an instruction from the management system 203 and transmits a control command conforming to the instruction to one or more control agents 321. The control agent 321 performs control according to the control command.

Each of the nodes 101 specifies, for each of the nodes, a transfer target data set on the basis of the node management bitmap 102 and transfers the transfer target data set. In the distributed storage system 100, it is possible to maintain consistency of data according to, for example, any one of methods explained below.

For each of stripes, any one of the nodes 101 is a responsible node. If a responsible node of a write destination stripe corresponding to a write request is the own node, the node 101 writes write target user data in the CM 51 and transfers, concerning the stripe, a transfer target data set to the other node. If the responsible node of the write destination stripe corresponding to the write request is not the own node, the node 101 transfers the write request to the responsible node (the other node).

Each of the nodes 101 includes, concerning the own node, a first CM portion in which a data set conforming to a write request is written and a second CM portion in which a data set conforming to a received command for transfer is written. The node 101 adopts, as a write target in a strip in a node area of the own node, one of the CM portions that stores a newer data set.

Figure 4:
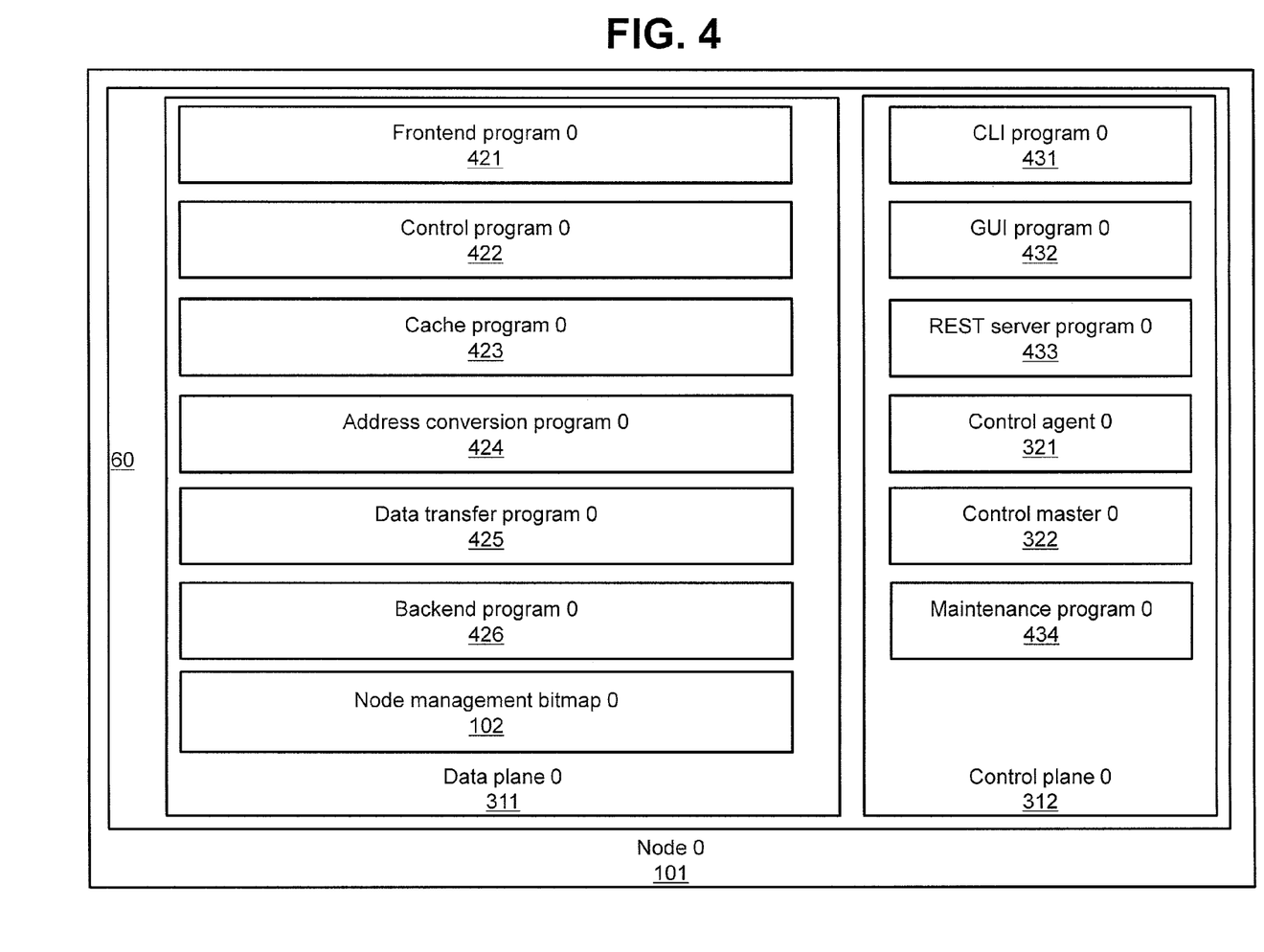
FIG. 4 shows a logical configuration of a node.

FIG. 4 shows a logical configuration of the node 101.

In the node 101, the data plane 311 includes a frontend program 421, a control program 422, a cache program 423, an address conversion program 424, a data transfer program 425, and a backend program 426. A data plane 0 manages the node management bitmap 102. The frontend program 421 receives an I/O request and returns a response to the I/O request. The control program 422 executes processing of the receive I/O request and executes transfer processing asynchronously with the processing of the I/O request. The cache program 423 updates the CM 51 and updates the node management bitmap 102. The address conversion program 424 converts a cache address (a logical address of a CM) into a strip address (a logical address of a strip). The data transfer program 425 transmits a command for transfer designated one or more transfer target data sets and transmits a write command designated one or more write target data sets. The backend program 426 writes, in response to the write command, the one or more write target data sets designated in the write command in one or more strips.

In the node 101, the control plane 312 includes a CLI (Command Line Interface) program 431, a GUI (Graphical User Interface) program 432, a REST (REpresentational State Transfer) server program 433, the control agent 321, the control master 322, and a maintenance program 434. The CLI program 431 receives an instruction from a user of the host 201 through a CLI. The GUI program 432 receives an instruction from the user of the host 201 through a GUI. In the node 101, the REST server program 433 receives an instruction from an external program (e.g., a not-shown application program), which is at least one program outside the controller 60 (e.g., an SDS). For example, the REST server program 433 can issue an instruction to the maintenance program 434 according to the instruction from the external program. The control agent 321 receives an instruction from the control master 322 in at least one node 101. The control master 322 issues an instruction to the control agent 321 in at least one node 101. The maintenance program 434 receives an instruction from the REST server program 433 and performs maintenance conforming to the instruction (e.g., changes a maximum transfer length (the length of a sub-bitmap) corresponding to at least one node).

An example of processing performed in this embodiment is explained below. The processing is explained with reference to the node 0 as an example.

Figure 5:
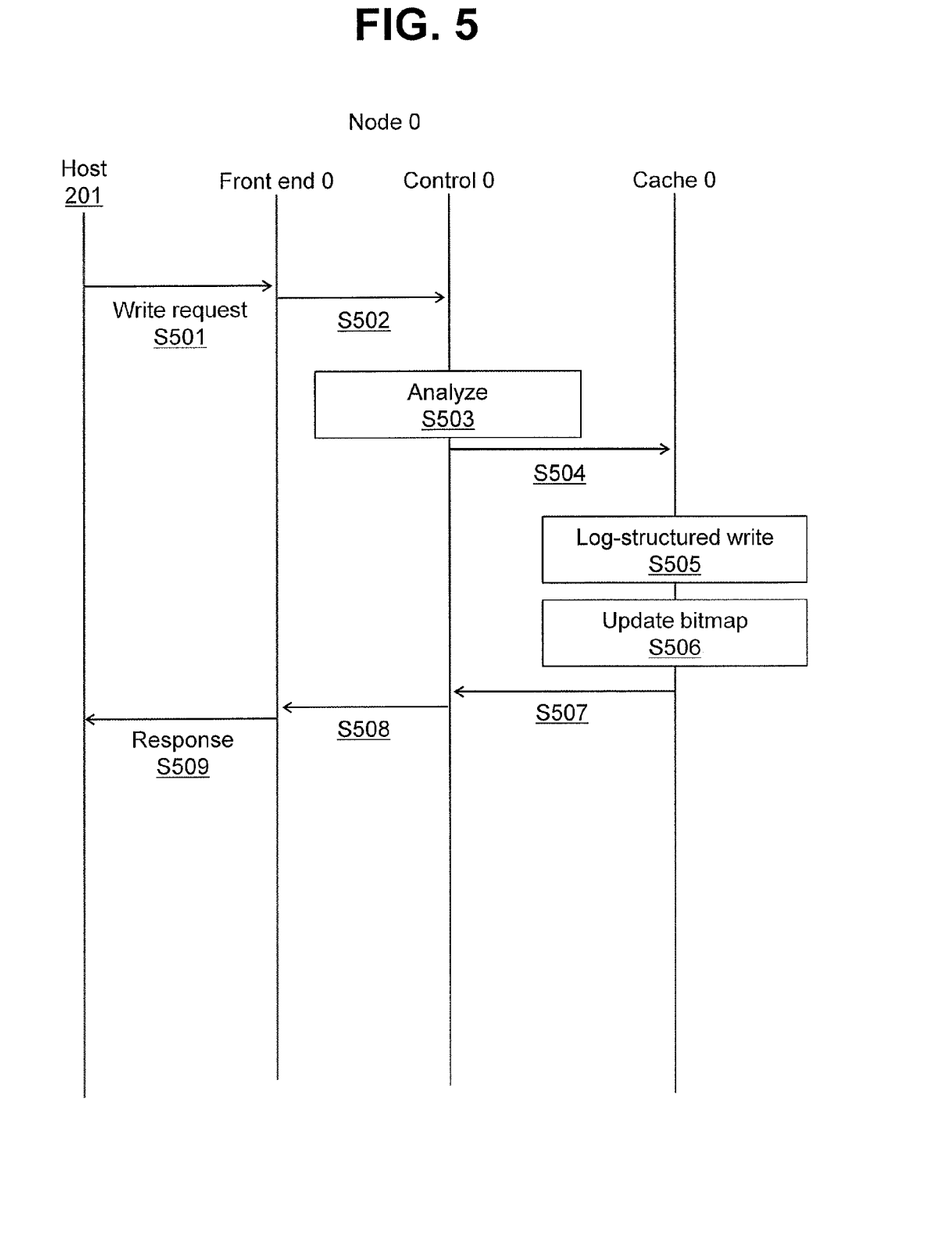
FIG. 5 shows a flow of host write processing.

FIG. 5 shows a flow of host write processing.

A frontend program 0 receives a write request for user data from the host 201 (S501). The write request includes write destination information, which is information indicating a write destination. The write destination information includes, for example, an ID (e.g., an LUN (Logical Unit Number)) of a write destination VOL and a logical address of a write destination area in the write destination VOL.

The frontend program 0 transfers the write request to a control program 0 (S502).

The control program 0 analyzes the write request (S503). For example, the control program 0 specifies that a request is a write request and specifies write destination information in the write request.

The control program 0 instructs a cache program 0 to cache user data conforming to the write request (S504).

The cache program 0 performs, in response to the instruction, log-structured write of the user data in a CM 0. That is, the cache program 0 writes the user data in the CM 0 in a log-structured scheme (S505). Note that, as shown in FIG. 5, the log-structured write may be performed in processing performed in response to the write request or may be performed asynchronously with the processing performed in response to the write request (e.g., after writing the user data in the CM 0, the cache program 0 may perform the log-structured write such that discrete data sets are continuous in the CM 0).

The cache program 0 updates the node management bitmap 0 according to an update of the CM 0 in S505 (S506). For example, when a data set conforming to user data, a write destination of which is a new VOL area (an area in the VOL), is written in a cache strip, the cache program 0 updates a value of a bit corresponding to the cache strip from "0" to "1".

The cache program 0 returns a response to the instruction in S504 to the control program 0 (S507). When receiving the response, the control program 0 returns a response to the request in S502 to the frontend program 0 (S508). When receiving the response, the frontend program 0 returns a completion response to the write request in S501 to the host 201 (S509).

Figure 6:
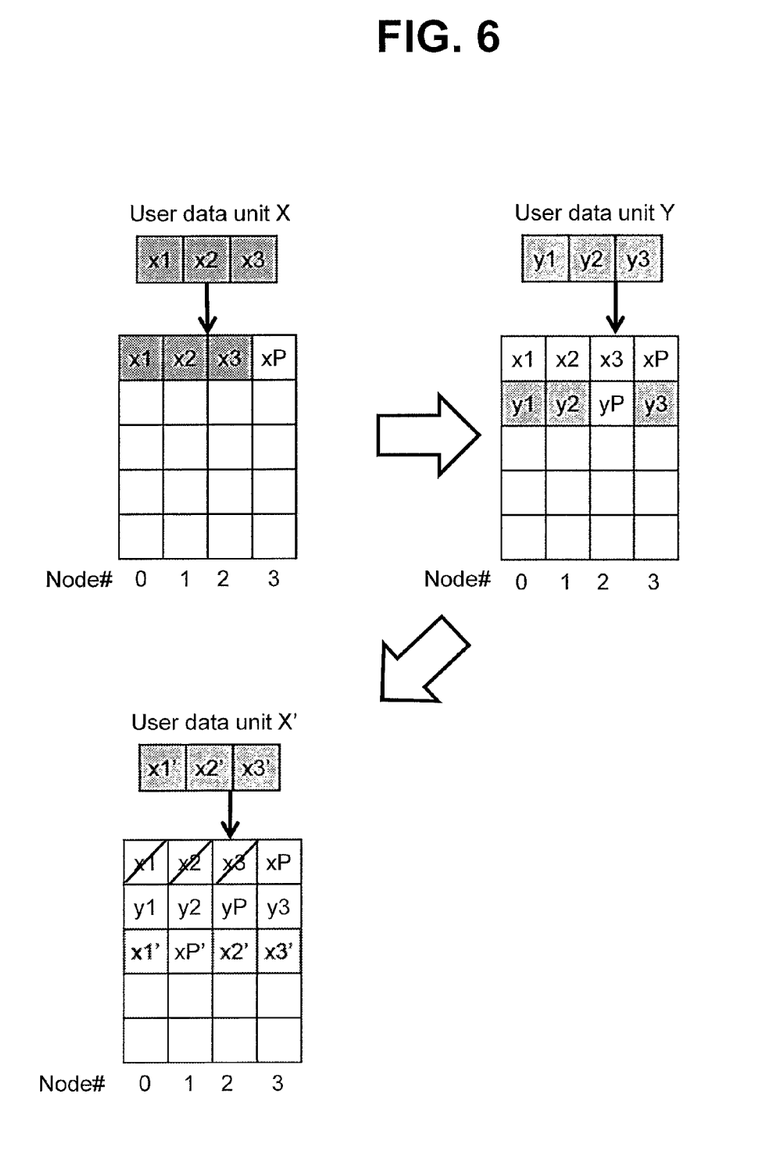
FIG. 6 shows an example of log-structured write.

An example of the log-structured write is explained with reference to FIG. 6.

When a new user data unit X is a write target, the cache program 0 writes user data sets x1, x2, and x3 configuring the user data unit X and a parity xP based on the user data sets in a first cache stripe (continuous cache strips).

When a new user data unit Y is a write target, the cache program 0 writes user data sets y1, y2, and y3 configuring the user data unit Y and a parity yP based on the user data sets in a second cache stripe, which is the next cache stripe of the first cache stripe (specifically, a second cache stripe, the head of which is the next cache strip of a terminal end cache strip of the first cache stripe).

When a user data unit X' for updating the entire user data unit X is a write target, the cache program 0 writes user data sets x1', x2', and x3' configuring the user data unit X' and a parity xP' based on the user data sets in a third cache stripe, which is the next cache stripe of the second cache stripe. The cache program 0 manages, as free spaces, three cache strips that respectively store the user data sets x1, x2, and x3 configuring the user data unit X before update. A cache strip in which the parity xP before update is stored may also be managed as a free space.

In this way, with the log-structured write, a data set after update is not overwritten in an area in which a data set before update is stored. An area is reserved anew for the data set after update. The area becomes a cache strip anew. Consequently, even if random write in which write destination addresses are discontinuous is performed, it is possible to obtain, in the CM 0 having a fixed address length, a data area in which addresses are continuous (a transfer target cache strip in which addresses are continuous).

Note that three write destination strips respectively corresponding to the user data sets x1', x2', and x3' after update are the same as three write destination strips respectively corresponding to the user data sets x1, x2, and x3 before update. Therefore, the cache program 0 may not update the node management bitmap 0 (e.g., a value of a bit corresponding to a cache strip storing the user data set x1 before update may keep "1"). However, since an address of a cache strip in which a transfer target data set is stored is changed, the cache program 0 may change a cache address corresponding to the bit "1" from an address of a cache strip storing a user data set (e.g., x1) before update to an address of a cache strip storing a user data set (e.g., x1') after update.

Figure 7:
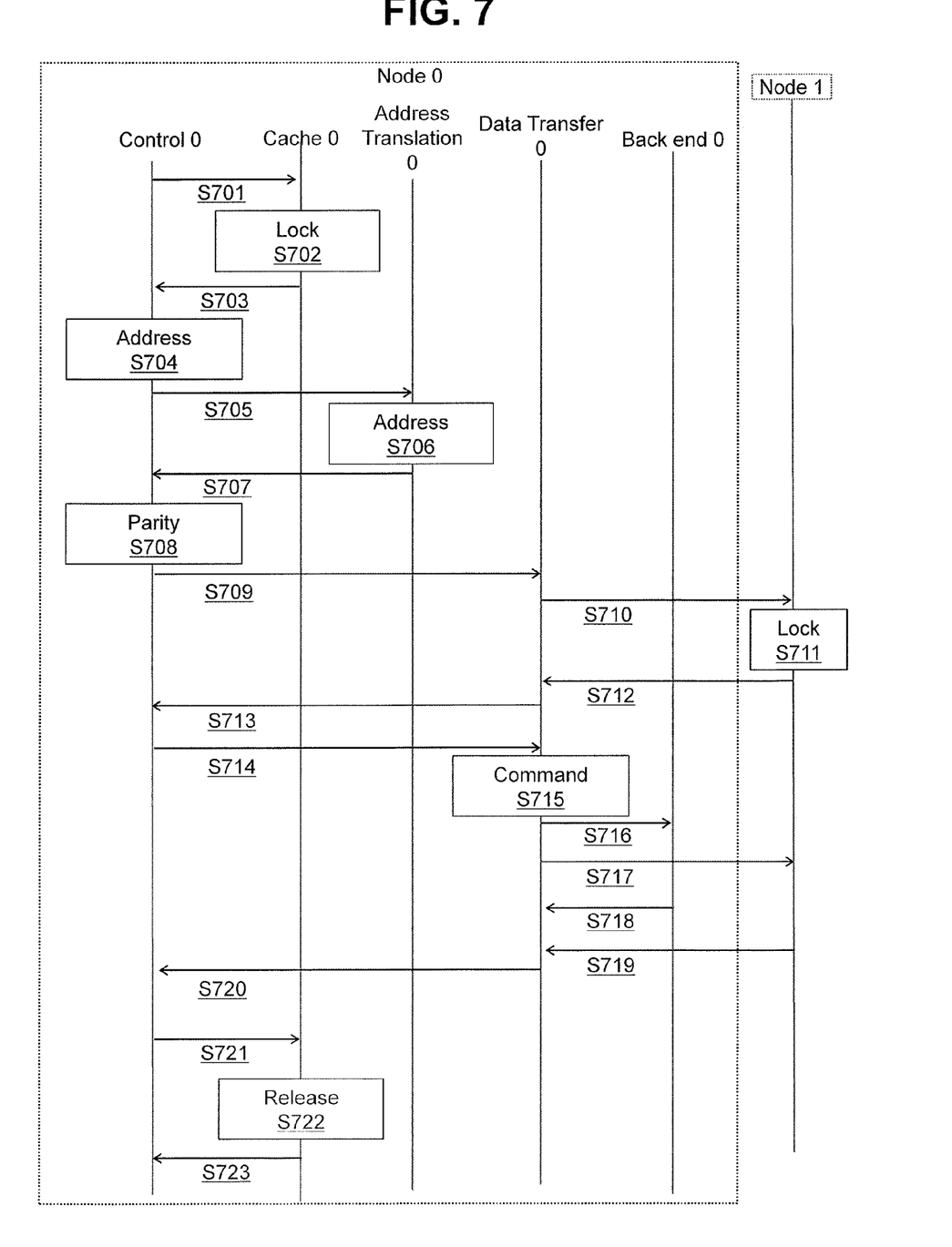
FIG. 7 shows a flow of asynchronous transfer processing.

FIG. 7 shows a flow of asynchronous transfer processing. The asynchronous transfer processing is transfer processing performed asynchronously with the host write processing and is processing including processing for transferring transfer target data to a transfer destination node.

The control program 0 instructs the cache program 0 to acquire a lock (S701).

The cache program 0 performs processing described below in response to the instruction (S702).

The cache program 0 refers to the node management bitmap 102 and specifies, concerning each of the nodes 0 to 3, a transfer target cache strip. The processing is explained below with reference to the node 1 as an example.

The cache program 0 performs, concerning the node 1, lock determination, which is determination concerning whether continuous cache strips including specified all transfer target cache strips can be locked.

When a result of the lock determination is true, the cache program 0 locks the continuous cache strips. Data sets in the locked cache strips are not updated in the host write processing.

The cache program 0 returns, as a response to the instruction in S701, a response representing a result of S702 to the control program 0 (S703).

The control program 0 specifies cache addresses of transfer target cache strips among the locked continuous cache strips (S704). The control program 0 instructs an address conversion program 0 to convert the cache addresses specified in S704. In response to the instruction, the address conversion program 0 specifies a strip address corresponding to the cache address (S706) and returns the specified strip address to the control program 0 (S707).

According to necessity (e.g., when the node 0 is responsible to at least parity generation concerning a stripe including the strips), the control program 0 reads a data set before update from the node 1 and generates a parity (S708).

The control program 0 instructs a data transfer program 0 to perform cache lock of the node 1 (S709). In the instruction, the number of strips and a strip address group are designated. The number of strips is, for example, the number of the cache strips locked in S702 concerning the node 1 or the number of transfer target cache strips among the cache strips locked in S702 concerning the node 1. The strip address group may be addresses of one or more strips in the node area 1 or may be sets of strip addresses and transfer lengths. In response to the instruction, the data transfer program 0 transmits a lock request to the node 1 (S710). In the lock request as well, the number of strips and a strip address group are designated. That is, the lock request is a request for locking (reserving) cache strips as many as the designated number of strips from a CM of the node 1. In response to the lock request, the node 1 (e.g., a controller 1) locks areas (cache strips) as many as the designated number of strips from the CM 1 (e.g., locks the cache strips from the cache node area 1) and associates the strip address group with the areas (S711). The node 1 (e.g., the controller 1) returns a response to the instruction in S710 to the data transfer program 0 (S712). The data transfer program 0 returns a response to the instruction in S709 to the control program 0 (S713).

The control program 0 instructs the data transfer program 0 to perform data transfer (S714).

In response to the instruction, the following processing is performed.

- The data transfer program 0 generates a write command for writing all transfer target data sets in the node area 0 (S715). In the write command, a strip address group (addresses of strips in the node area 0) is designated. The data transfer program 0 instructs a backend program 0 to transmit the write command. In response to the instruction, the backend program 0 transmits the write command for write in the node area 0 (S716). The backend program 0 returns a response to the data transfer program 0 (S718).
- The data transfer program 0 generates a command for transfer of all the transfer target data sets to the node 1 (S715). In the command for transfer, the strip address group (addresses of strips in the node area 1) is designated. The data transfer program 0 transfers the command for transfer to the node 1 (S717). In response to the command for transfer, the node 1 (e.g., the controller 1) writes, in the cache strips locked in S711, a transfer target data set conforming to the command for transfer and returns a response to the data transfer program 0 (S719). In the node 1, the controller 1 writes the transfer target data set in strips of the node area 1 from the cache strips.

The data transfer program 0 returns a response to the instruction in S714 to the control program 0 (S720).

The control program 0 instructs the cache program 0 to release the lock (S721). In response to the instruction, the cache program 0 releases the lock acquired in S702 (S722). The cache program 0 returns a response to the instruction in S721 to the control program 0 (S723).

The asynchronous transfer processing is as explained above.

Note that, in the asynchronous transfer processing, a transfer source node transmits a command for transfer to a transfer destination node to transfer a transfer target data set from the transfer source node to the transfer destination node (transfer of a push type). However, the transfer destination node may transmit a transfer request to the transfer source node to transfer the transfer target data set from the transfer source node to the transfer destination node (transfer of a pull type).

A result of the lock determination (the determination concerning whether the continuous cache strips including all the specified transfer target cache strips can be locked) is false, for example, in cases described below.

- At least one of lock target cache strips is already locked.
- When the lock target cache strips are locked, a lock ratio (a ratio of a total capacity of locked cache strips to a capacity of a CM) exceeds a threshold.

When the result of the lock determination is false, the controller 0 may perform processing different from the asynchronous transfer processing (e.g., lock determination concerning cache strips in a cache node area corresponding to the other node).

Concerning all the nodes 101, the maximum transfer length (the length of the sub-bitmap 70 in the node management bitmap 102) does not need to be the same. For example, the maximum transfer length can be configured or changed as explained below.

Figure 8:
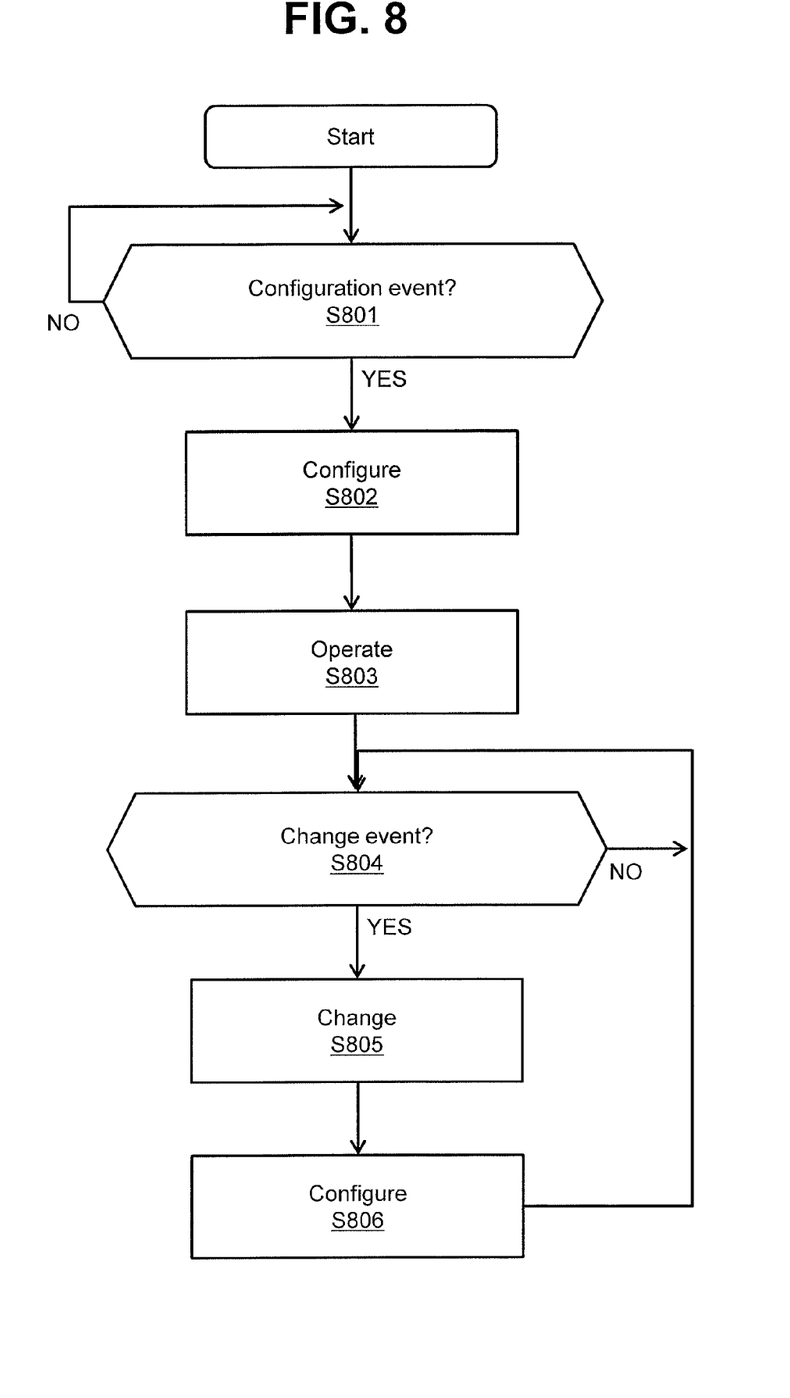
FIG. 8 shows a flow of maximum transfer length control processing.

FIG. 8 shows a flow of maximum transfer length control processing. The maximum transfer length control processing is executed in the node 101. In the following explanation, the maximum transfer length control processing is explained with reference to the node 0 as an example.

When a configuration event for configuring a maximum transfer length occurs (YES in S801), the maximum transfer length is configured in the node 0 (S802). That is, the sub-bitmap 70 is configured in the node 0 concerning each of the nodes 0 to 3. The "configuration event" may be, for example, any one of events described below.

- A CLI program 0 receives a configuration instruction designating the maximum transfer length from the host 201.
- A GUI program 0 receives a configuration instruction designating the maximum transfer length from the host 201.
- The maintenance program 434 receives a configuration instruction designating the maximum transfer length from the external program through a REST server program 0.
- A control master 0 receives a configuration instruction designating the maximum transfer length from the management system 203.

The designated maximum transfer length may be determined by any of the management system 203, the external program, and the controller 0.

The maximum transfer length is based on a performance value of the controller 0 (e.g., an SDS). Specifically, the maximum transfer length is based on, for example, at least one of the following. Note that, in the following explanation, "K is relatively large (or small)" means that "a value k2 of another certain K is larger (or smaller) than a value k1 of a certain K". "The maximum transfer length is relatively small (or large)" means that "a maximum transfer length t2 corresponding to the value k2 of the other certain K is smaller (or larger) than a maximum transfer length t1 corresponding to the value k1 of the certain K".

- I/O processing performance (an amount of data input and output per unit time) set as a target concerning the node 0. For example, when the I/O processing performance is relatively high, the maximum transfer length is relatively small. This is to reduce the influence of the asynchronous transfer processing on the performance of host I/O processing. Note that the "I/O processing performance" is the performance of processing of an I/O request (in this embodiment, an I/O request received from a host). The "I/O" may be write, may be read, or may be both of the write and the read.
- A network bandwidth of an interface unit mounted on the node 0. For example, the maximum transfer length is relatively smaller as the network bandwidth is relatively smaller. This is because transfer exceeding the performance of physical hardware, that is, the interface unit, cannot be performed.
- Multiplicity of the host write processing. For example, when the multiplicity is relatively large, the maximum transfer length is relatively small. This is because a resource amount usable for the asynchronous transfer processing is suppressed when the multiplicity is large.
- The number of nodes configuring the redundant configuration area 53. For example, when the number of nodes is relatively large, the maximum transfer length is relatively small. This is because, when the number of nodes is large, the number of sub-bitmaps increases and, therefore, a size of the node management bitmap tends to be large.

After a start of operation (S803), when a change event for changing the maximum transfer length already configured concerning at least one node occurs (YES in S804), the maximum transfer length configured in the node 0 is changed (S805). The maximum transfer length after the change is configured (S806). For example, the sub-bitmap 70 increases or decreases in length. The "change event" may be, for example, any one of the following.

The CLI program 0 receives a change instruction designated the maximum transfer length after the change from the host 201.

The GUI program 0 receives a change instruction designated the maximum transfer length after the change from the host 201.

The maintenance program 434 receives a change instruction designated the maximum transfer length after the change from the external program through the REST server program 0.

The maintenance program 434 detects that a load of the node 0 (e.g., a load of a calculation resource (hardware) or an operation state of one or more external program) is equal to or larger than any one threshold among one or more thresholds or smaller than any one of the thresholds.

The control master 0 receives a change instruction designated the maximum transfer length after the change from the management system 203.

A fixed time elapses from the last determination in S804.

The present time point reaches a predetermined time point.

The maximum transfer length after the change is based on, for example, at least one of the following.

A performance value of a calculation resource (hardware) of the node 0. For example, the controller 0 (e.g., a maintenance program 0) predicts a limit value of a bandwidth on the basis of the performance value of the calculation resource of the node 0 (e.g., an idle capacity of the CM 0) (or receives a predicted value of the limit value of the bandwidth from the outside such as the management system 203) and changes the maximum transfer length on the basis of the predicted value of the limit value.

An operation state of one or more external programs. For example, when one or a plurality of external programs (e.g., a certain external program) operates or stops anew, the controller 0 (e.g., the REST server program 0) receives a notification of the new operation or stop of the one or plurality of external programs from at least one of the one or plurality of external programs. Alternatively, the controller 0 (e.g., the maintenance program 0) receives a notification of the new operation or stop of the one or plurality of external programs from the management system 203. The controller 0 (e.g., the REST server program 0 or the maintenance program 0), which receives the notification, configures the maximum transfer length relatively small if the one or plurality of external programs operate anew and configures the maximum transfer length relatively large if the one or plurality of external programs stop anew.

Several embodiments are explained above. However, the embodiments are illustrations for the explanation of the present invention and are not meant to limit the scope of the present invention to only the embodiments. The present invention can be carried out in other various forms.

For example, as the write in the CM 51, the log-structured write does not always have to be adopted.

For example, for redundancy maintenance of a transfer target data set not transferred yet, the node 101 may write the transfer target data set in the PDEV unit and delete the transfer target data from the PDEV unit after completion of inter-node transfer of the transfer target data set.

For example, the transfer target data set can be referred to as "dirty data set", which is a data set not destaged from a CM. For example, a cache strip that stores the transfer target data set can be referred to as "dirty cache strip".

What is claimed is:

1. A non-transitory computer readable medium for improving performance of a distributed storage system, the non-transitory computer readable storage medium including a computer program stored thereon which when executed by a processor of a first node cause the processor to:

form a cache matrix having cache rows and cache columns in a cache memory of the first node, wherein the first node is selected from among a plurality of nodes that comprise the distributed storage system;

store, in the cache matrix, a data set to be written, wherein bits that comprise the data set are written to the cache matrix by each respective one of the cache rows in a log-structure scheme;

store, in a memory of the first node, node management information that indicates if data of the data set is transferred to each of the plurality of nodes;

transmit the data set to be written to the plurality of nodes, wherein each respective one of the cache columns is stored by a respective node from among the plurality of nodes;

update the node management information to reflect that each respective one of the cache columns contains data of the data set that is to be transferred by each respective node from among the plurality of nodes;

receive an update to the data set to be written that is stored in the cache matrix, and store the update to the data set in a different location in the cache matrix according to the log-structure scheme.

2. The non-transitory computer readable medium according to claim 1, wherein the data set to be written to the plurality of nodes is transmitted to the plurality of nodes by:

locking a plurality of cache strips of a particular cache column of the cache columns, wherein the particular cache column is stored in a particular node of the plurality of nodes; and transmitting a command for transfer of the particular cache column.

3. The non-transitory computer readable medium according to claim 2, wherein the plurality of cache strips set as lock targets are continuous to one another.

4. The non-transitory computer readable medium according to claim 2, wherein the log-structured scheme offsets a parity bit of the data set to be written in successive cache rows.

5. The non-transitory computer readable medium according to claim 2, wherein the node management information includes sub-node management information for each of the plurality of nodes, each of intra-node positions managed by the sub-node management information is a cache strip corresponding to the respective node, concerning each of the plurality of nodes, a maximum number of cache strips that can be locked by the first node depends on a size of the sub-node management information corresponding to the respective node, and concerning each of the nodes, the size of the sub-node management information depends on a maximum transfer length, which is a total amount of data sets that can be transferred by the first node.

6. The non-transitory computer readable medium according to claim 5, wherein, in the first node, concerning at least one of the plurality of nodes, the maximum transfer length is based on at least one of following:
    (p1) I/O processing performance set as a target concerning the node;
    (p2) a network bandwidth of the node;
    (p3) multiplicity of the I/O processing; and
    (p4) a number of the plurality of nodes.

7. The non-transitory computer readable medium according to claim 6, wherein
    when (p1) is adopted, the maximum transfer length is smaller when the I/O processing performance is high,
    when (p2) is adopted, the maximum transfer length is smaller when the network bandwidth is small,
    when (p3) is adopted, the maximum transfer length is smaller when the multiplicity of the I/O processing is large, and
    when (p4) is adopted, the maximum transfer length is smaller when the number of nodes is large.

8. The non-transitory computer readable medium according to claim 5, wherein, after a start of operation of the first node, in the first node, concerning at least one of the plurality of nodes, the computer program is configured to cause the first node to change the maximum transfer length based on least one of following:
    (q1) a performance value of a calculation resource of the first node; and
    (q2) an operation state of one or more external programs, which are programs executed in the first node, the programs being any one or more programs other than the computer program.

9. The non-transitory computer readable medium according to claim 8, wherein
    the computer program is configured to cause the first node to execute:
    when (q1) is adopted, changing the maximum transfer length based on a predicted value of a bandwidth limit value based on the performance value of the calculation resource of the first node, and
    when (q2) is adopted, configuring the maximum transfer length which is small according to new operation of one or a plurality of external programs and configuring the maximum transfer length which is large according to a new stop of the one or a plurality of external programs.

10. A distributed storage system comprising:
    a plurality of nodes that includes a first node, wherein each of the plurality of nodes includes a memory, a communication and a processor that is communicatively coupled to the memory and communication interface;
    wherein the processor of the first node is configured to:
    form a cache matrix having cache rows and cache columns in a cache memory within the memory of the first node,
    store, in the cache matrix, a data set to be written, wherein bits that comprise the data set are written to the cache matrix by each respective one of the cache rows in a log structure scheme,
    store, in the memory of the first node, node management information that indicates if data of the data set is transferred to each of the plurality of nodes,
    update the node management information to reflect that each respective one of the cache columns contains data of the data set that is to be transferred by each respective node from among the plurality of nodes;
    receive an update to the data set to be written that is stored in the cache matrix, and
    store the update to the data set in a different location in the cache matrix according to the log structure scheme.

11. A distributed storage control method that improves performance of a distributed storage system, the method comprising:
    forming, by a processor of a first node, a cache matrix having cache rows and cache columns in a cache memory of the first node, wherein the first node is selected from among a plurality of nodes that comprise the distributed storage system;
    storing, by the processor, a data set to be written in the cache matrix, wherein bits that comprise the data set are written to the cache matrix by each respective one of the cache rows in a log-structure scheme;
    storing, by the processor, node management information in a memory of the first node, wherein the node management information indicates if data of the data set is transferred to each of the plurality of nodes;
    transmitting, by the processor, the data set to be written to the plurality of nodes, wherein each respective one of the cache columns is stored by a respective node from among the plurality of nodes;
    updating, by the processor, the node management information to reflect that each respective one of the cache columns contains data of the data set that is to be transferred by each respective node from among the plurality of nodes;
    receiving, by the processor, an update to the data set to be written that is stored in the cache matrix, and
    storing, by the processor, the update to the data set in a different location in the cache matrix according to the log-structure scheme.

* * * * *